Dec. 15, 1925.  
H. TUCKER  
1,566,131  
SUPPORT FOR TAIL LAMPS ON MOTOR VEHICLES  
Filed July 31, 1923
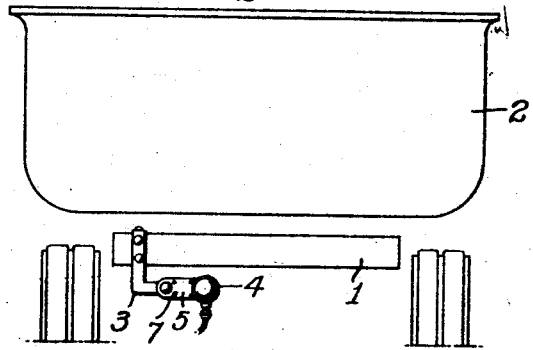
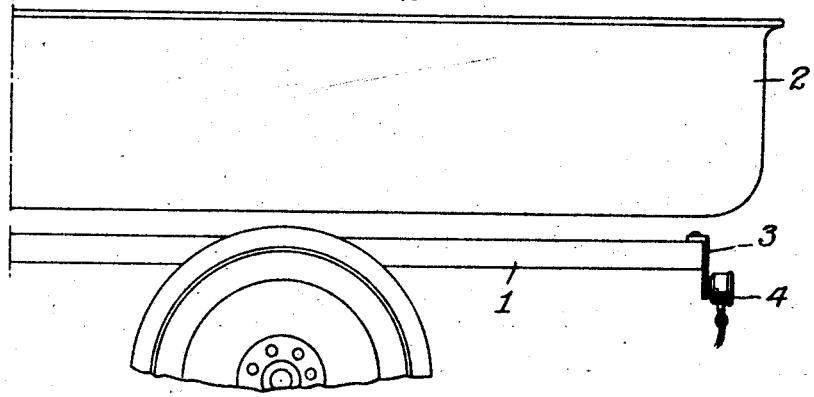
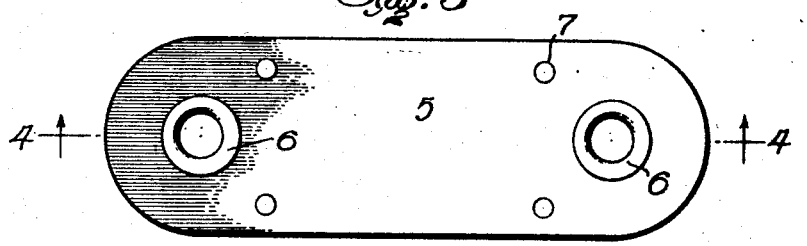
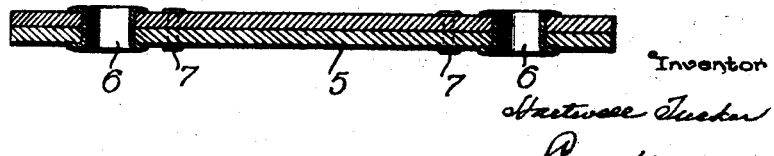

Patented Dec. 15, 1925.

1,566,131

UNITED STATES PATENT OFFICE.

HARTWELL TUCKER, OF PRINCE GEORGES COUNTY, MARYLAND.

SUPPORT FOR TAIL LAMPS ON MOTOR VEHICLES.

Application filed July 31, 1923. Serial No. 654,912.

*To all whom it may concern:*

Be it known that I, HARTWELL TUCKER, a citizen of the United States, and a resident of Prince Georges County, in the State of Maryland, have invented certain new and useful Improvements in Supports for Tail Lamps on Motor Vehicles, of which the following is a specification.

This invention relates to improved means for supporting electric lamps upon motor vehicles, and particularly to supporting means for the rear or tail lamp for use on a motor truck.

With the adoption of electric lamps for motor vehicles generally, the attempt has also been made to use such a lamp for the tail light on motor trucks to show the usual red indication as a danger or warning signal to an approaching vehicle, and also to project white light on to the license tag or plate. Because of the severe jolting and shocks to which the lamp is subjected when used in this position, the life of a filament lamp is very short, and the danger of its being broken and hence not lighted is so great, that its use has been to a large extent discontinued with the necessity of reverting to the use of an oil lamp.

On a motor truck severe vibration and jolting of the tail lamp is caused by the fact that solid tires are quite generally used, and the bracket for supporting the tail lamp must be attached to the chassis or body of the vehicle at a considerable distance from the rear axle, particularly on those trucks with long bodies which overhang the rear axle to such an extent that the rear light would be obscured if fastened close to the axle housing. With my improved supporting means, consisting of a shock-absorbing element or link between the lamp and its support, it is possible to use electric filament lamps for the rear or tail lights on trucks or other heavy duty vehicles, regardless of the location of the supporting bracket or of the rough usage to which the commercial vehicles are frequently subjected.

The detail construction of the supporting means constituting my invention, is shown in the accompanying drawing, which forms a part of this application, and in which—

Fig. 1 is an end elevation of a motor truck with the lamp support secured to end cross-member of the chassis.

Fig. 2 is a side elevation of the truck shown in Fig. 1, and illustrating the usual position of the tail light with relation to the rear supporting axle of the vehicle.

Fig. 3 is a detail view of the flexible or yielding link in the lamp supporting means, which constitutes my invention, and Fig. 4 is a sectional view on the line 4—4 of Fig. 3.

Referring to Fig. 1 the numeral 1 indicates the end or cross-member of the supporting frame of a truck or vehicle, the body of which is indicated at 2. This vehicle is shown in Fig. 2 as one in which the frame and body extend rearwardly a considerable distance beyond the supporting axle. With the tail light attached to the end of the chassis of the vehicle, the jarring and jolting to which the lamp would be subjected in traveling over a rough road, for example, is severe and detrimental to the life of a filament lamp. The radius of movement of the lamp is its distance from the center of the rear axle, and the vertical movements of the rear wheels, due to unevenness or roughness of the road being traveled, may cause a considerably greater and abrupt movement of the tail lamp which, if rigidly supported, not infrequently is damaged to the extent of having the filament broken. 3 is a lamp bracket which may be of any desired type or form and which forms no part of the present invention. This is generally a rigid casting or forging with openings to facilitate its placement on the vehicle and the attaching of a lamp to a laterally extended arm.

In place of securing the lamp 4, directly to the bracket 3, this invention contemplates an intermediate element or link 5, preferably of fibrous material such as leather or the like, which constitutes a shock absorbing or yielding connection between the lamp and its rigid support. The element 5 is, when made of leather, substantially rectangular in shape, i. e., having greater length than width and of sufficient thickness to give the required supporting strength. I have found that if leather is used, the grade known as belt leather, is most satisfactory, but obviously other kinds of leather might be used and also rubber or a composition of rubber and fabric may be substituted for leather as the material from which the element 5 may be made. As shown in Figs. 3 and 4, a transverse opening is provided near either end of the element 5 through which a bolt or other securing means may be passed. The opening at one end is for securing means to the bracket or other support, and the opening at the opposite end is for the lamp attaching means. These openings may be protected by metallic eyelets or gromets to prevent undue wear or cutting of the member 5, by the metal attaching means.

The element 5 possesses the greatest flexibility, and hence offers less resistance to bending, transversely to its length; but it also has limited flexibility in all directions, and is proportioned as to thickness, length and width with this end in view. Actual tests have proven that where the element is made of belt leather, it gives satisfactory results when of the following dimensions: length six (6) inches, width two and one-half (2½) inches, and thickness three-eighths (⅜) inches. I do not intend to be limited to these precise figures, but disclose them merely by way of concrete illustration. The flexing link is supported when used, by the lamp bracket 3, or other attaching means, in a vertical plane as shown in Fig. 1.

Since the vehicle body in moving over a rough road may have motion which changes in direction very suddenly, the tail lamp is subjected to forces tending to produce motion in various directions, and I have discovered that in proportioning the dimensions of the flexing link 5, substantially as above described, and supporting the same so that its major axis of flexure is normal to the horizontal, all shocks or forces tending to impart sudden movement to the tail lamp are either absorbed by the link 5 or else the yielding connection fails to transmit these forces to any extent which is destructive of the lamp filament. As shown in Fig. 4 two layers of the flexible material are employed in order to secure the requisite thickness; and when this arrangement is necessary, rivets 7 are used to join the layers, so that the assembled element will flex as a unit.

What I claim as new and desire to secure by United States Letters Patent, is:

Supporting means for the tail lamp of a motor vehicle comprising a rigid support and a single flexible shock absorbing element of fibrous material interposed between the rigid support and the lamp, said flexible element constituting the sole connection between the rigid support and the lamp, the said flexible element having greater length than width and provided with means to permit attaching of the lamp at one end and means for securing the element to the rigid support at its opposite end, the said flexible element constituting a yielding cantilever supporting arm for the lamp with its major axis of flexure in a vertical plane.

In testimony whereof, I have signed my name to this specification.

HARTWELL TUCKER.